United States Patent Office 3,457,847
Patented July 29, 1969

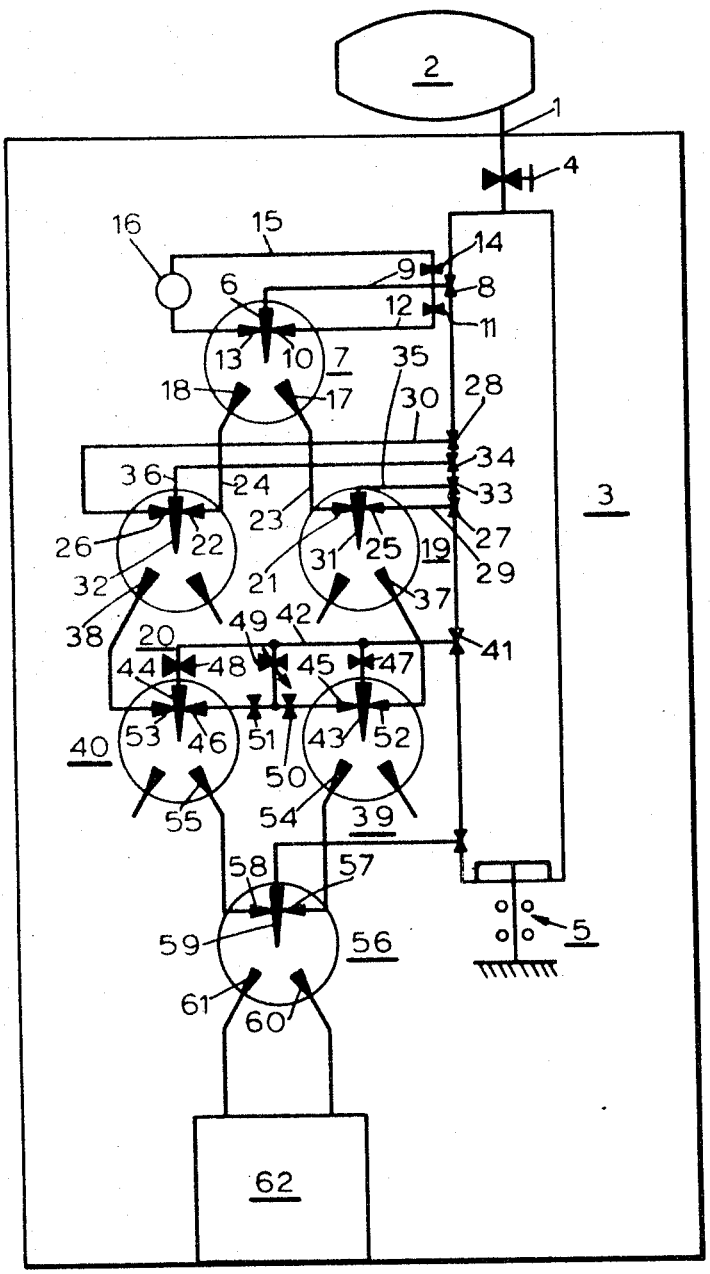

3,457,847
RATE OF CHANGE OF PRESSURE CONTROL
Owen Desmond Furlong, East Coker, Somerset, England, assignor to Westland Aircraft Limited, Yeovil, Somerset, England
Filed July 17, 1967, Ser. No. 653,744
Claims priority, application Great Britain, Aug. 30, 1966, 38,711/66
Int. Cl. B64d *13/04;* F15c *1/14*
U.S. Cl. 98—1.5                                6 Claims

ABSTRACT OF THE DISCLOSURE

A fluid system including a fluid amplifier which senses rate of change of ambient pressure by receiving into the lines of both control nozzles of the fluid amplifier a pressure which varies with the ambient pressure, one line having a greater volumetric capacity than the other, such that the change of pressure in this line leads or lags the pressure in the other line whenever a change in ambient pressure occurs. Another stage may suppress the output from the first stage to limit the rate of change detected to within a predetermined range. Another stage may include a fluid amplifier wherein the fluid to the power nozzle and to the control nozzle nteract, and wherein the proportion of fluid to each may be varied, thereby varying the range of the rate of change to be detected.

---

This invention relates to methods of obtaining a function of rate of change of pressure, of use in particular, but not exclusively, for controlling the rate of change of pressure of aircraft compartments.

Previously, pneumatic capsules or other pressure sensors have been employed in conjunction with mechanical linkages or electronic circuits, to obtain an output related to rate of change of pressure. The output actuates means which limit the rate of change of pressure to an acceptable maximum. For example, in an aircraft, a rate of change of pressure corresponding to an altitude change of more than 300 feet per minute can cause discomfort to passengers. Similarly in underwater applications or high pressure chambers, sudden changes in pressure can have serious consequences.

The present invention employs a fluid amplifier to derive a rate term, or function of rate of change of pressure for indication or control purposes, in conjunction with pressurization systems. The fluid amplifiers employed in the system comprise beam deflection fluid devices without moving parts, generally of the analogue type, although wall attachment or similar types of amplifier with a bi-stable output are suitable for some applications.

It has been previously proposed to employ such amplifiers to obtain a rate term. In this proposal, the ambient pressure around the amplifier is applied through ducts to a pair of opposed control nozzles reacting upon a power jet. One of the ducts to the nozzle includes a greater volumetric capacity than the other nozzle, and provides a lead lag effect to obtain a rate term. This device suffers from the disadvantage that the total flow to the control nozzles is very small, and is difficult to trim or adjust. It is also difficult to obtain desirable values for the Reynolds' number at the control ports, and the volume of the capacity has to be of impracticably large dimensions, to be fully effective.

It is an object of the invention to provide a method of obtaining a rate term from a fluid amplifier device, in which the total flow to the control nozzles is improved, and the capacity is reduced to convenient proportions.

The invention consists in a system for obtaining an output related to rate of change of ambient pressure from a fluid amplifier device subjected to said ambient pressure, said amplifier device, being vented to ambient, including a fluid power jet which issues from a power nozzle, and is directed to vent to one or more output channels by interaction with at least a pair of control nozzles opposed to each other in their effect upon the power jet, wherein fluid flows from a source of fluid at a pressure above the ambient pressure through ducts to said pair of control nozzles, one of said ducts having a greater volumetric capacity than the other duct supplying the opposed nozzle of said pair of control nozzles, in order to cause a lead or lag of fluid pressure or flow between one and the other of said pair of control nozzles during a pressure change.

In another aspect of the invention we provide a fluid control system, whereby an output signal related to rate of change of ambient pressure and derived from a sensing device subjected to said ambient pressure is passed through one or more cascaded stages of fluid amplifiers, at least one of said stages having means to suppress the output from said sensing device during stable pressure conditions, and including or assembled with variably biased control means, for restricting the output from said sensing device to within a predetermined range, the resultant signal being applied to said control system as a function of rate of change of pressure.

In a further aspect of the invention we provide a fluid pressurization system for aircraft, including a fluid amplifier rate of change of pressure control, said control consisting in a biassing system for fluid amplifier circuits having at least one power jet issuing from a power nozzle, and at least one fluid bias pressure or interacting jet imposed from a bias control nozzle, and operable on said one or more of said power jets, wherein regulation of the flow of fluid to at least one of said bias control nozzles is interrelated with the flow of fluid to at least one of said power nozzles and means causing variation in the flow of fluid to the interrelated bias control nozzle or nozzles producing inversely proportional variations in the flow of fluid from the interrelated power nozzle or nozzles, said variation resulting in an output signal through channels that is applied to said pressurization system as a function of rate of change of pressure.

In order to explain the invention more clearly, an embodiment of the invention will be described with reference to the accompanying drawing, which shows a diagram of a fluid amplifier system for deriving a function of rate of change of pressure, and applying the output to indicator or control means.

In the drawing, a pressure source, in this embodiment a tapping 1 from an aircraft engine 2, supplies a manifold 3 through a pressure reducing valve 4. A pressure relief valve 5 is provided to avoid excessive pressure.

The manifold 3 supplies the power nozzle 6 of a fully vented beam deflection fluid amplifier 7 through a restricting orifice 8 and a duct 9. The duct 9 also branches to supply two opposed control nozzles 10 and 13 of the amplifier 7, through ducts 12 and 15, and trimming or adjusting restrictions 11 and 14, of the orifice type, although capillary type restrictions are also suitable. One of the ducts 15 also includes an accumulator 16, which takes the form of a sealed container with inlet and outlet connections to the duct. In some applications the accumulator 16 could be variable, to adjust the signal strength from the amplifier.

The control nozzles 10 and 13 are fed through a branch from the duct 9 to the power nozzle 6, rather than from the manifold 3, as the pressure required at the control nozzles 10 and 13 is of a very low order compared to that in the manifold 3, and the two-stage reduction, first through restriction 8, and then through the trimming restrictions 11 and 14, allows improved adjustment of the pressures.

The action of the paired opposed nozzles 10 and 13, which can operate by jet impingement or pressure interaction, depending upon the construction of the amplifier, is to direct the power jet from the power nozzle 6 to vent, or progressively to bias the jet into one or other of two outlet channels 17 and 18.

In operation, under stable pressure conditions, the pressure or flow from the control nozzles 10 and 13 is balanced by adjustment of the restrictions 11 and 14, so that the power jet output is mainly directed to vent, and any signal from the output channels 17 and 18 is balanced. During conditions of pressure reduction around the amplifier, air from the accumulator 16 tends to augment the pressure or flow from the nozzle 13, whilst the pressure or flow at the opposed nozzle 10 alters more quickly to a reduced value. The differential between the nozzles causes the power jet to be directed proportionally towards outlet channel 17. In the opposite condition of pressure increase, the pressure or flow at nozzle 10 tends to build up faster than that at nozzle 13, in which the capacity requires to be charged to a new level, and, accordingly, the power jet is proportionally directed more strongly into outlet channel 18. Thus, the pressures at the outlet channels 17 or 18, relative to each other, or to an absolute pressure, provide a function of the rate of change of pressure around the amplifier 7.

A second stage of amplification, including a pair of fluid amplifiers 19 and 20, is provided to suppress the output from the first stage amplifier 7, during stable pressure conditions. This stage can also be used to reduce the sensitivity of the system to conditions of rate of change which are of negligible proportions.

In each of the amplifiers 19 and 20, one of the control nozzles 21 and 22 is supplied from the output channels 17 and 18 of the previous amplifier 7 through ducts 23 and 24 respectively. Control nozzles 25 and 26, opposed to the signal control nozzles 21 and 22, are supplied with a fixed fluid bias supply from the manifold 3, by way of restrictions 27 and 28, and ducts 29 and 30. The power jets, issuing from nozzles 31 and 32, are supplied from the manifold 3 through restrictions 33 and 34, and ducts 35 and 36, and are directed, when the pressure conditions are stable or changing at a negligible rate, to vent by the fixed bias from control nozzles 25 and 26. However, when a rate signal from one of the output channels 17 or 18 of the previous amplifier 7, of sufficient strength, overcomes the bias effect, the power jet from nozzle 31 is directed, during a pressure reduction, into outlet channel 37, or, during a pressure increase, the power jet from nozzle 32 is directed into outlet channel 38. When there is no pressure change, or a change of minimal value, affecting the first stage amplifier 7, the output from the first stage is suppressed by the bias in the second stage, and directed to vent.

The third stage of the system, comprising a pair of variably biassed fluid amplifiers 39 and 40, provides adjustment of the range of the rate control. For example, the range might extend, in an aircraft, to allow adjustment between a maximum rate of change of pressure equivalent to an altitude change of 300 feet per minute, and a minimum pressure change rate equivalent to an altitude change of 1,000 feet per minute.

In this stage, a single restriction 41 throttles the fluid flow from the manifold through a duct 42, which supplies both power nozzles 43 and 44, and variable bias control nozzles 45 and 46. The power nozzles 43 and 44 are supplied through fixed restrictions 47 and 48 from the duct 42, and the control nozzles are supplied through a common variable restriction 49, and individual fixed balancing restrictions 50 and 51. The restriction 41 at the manifold 3 is adjusted to limit the fluid available to the power nozzles 43 and 44, and the bias nozzles 45 and 46, so that, if the variable restriction 49 is adjusted to increase the flow to the bias nozzles 45 and 46, the supply available to the power nozzles 43 and 44 is curtailed, and the power jet flow is reduced. The result is to increase the range of variation of the bias control in its effect upon the output of the amplifiers 39 and 40.

The rate signal, originating at the first amplifier 7, and trimmed to exclude signals of minimal and negligible value in the second stage, issues, in the event of a decrease in pressure, from an outlet channel 37 of the second stage amplifier 19, and is ducted to control nozzle 52 of the third stage amplifier. In the event of a pressure increase, the rate signal issues from outlet 38 of the second stage amplifier 20, and is ducted to control nozzle 53 of the third stage amplifier 40.

The rate signals from these control nozzles 52 and 53, if of sufficient value to overcome the setting of the variable bias, direct the power jets from power nozzle 43, in the event of a decreasing pressure, into an outlet channel 54 of amplifier 39, or from power nozzle 44, during a pressure increase, into outlet 55 of amplifier 40.

The output from channels 54 and 55 of the third stage can be applied directly to an actuator or an indicator, or, as in the present embodiment, applied to a fourth stage amplifier 56. The output from channels 54 and 55 of the third stage is applied to opposed control nozzles 57 and 58, respectively, of the fourth stage, and directs a power jet from a power nozzle 59 to vent, or into output channels 60 or 61. The output is applied differentially across an actuator or indicator 62.

In applying the system to an aircraft, the amplifier 7 would be situated in an aircraft cabin, and the actuator 62 could be a cabin pressurisation control system operating a cabin air discharge valve. In such an embodiment, the rate control system would produce an overriding control upon the cabin pressurisation control system, and limit any rate of change of pressure to a desirable maximum.

The circuit, as described and indicated in the drawing, can be modified in many ways, without departing from the scope of the invention. For example, the system could operate on a liquid fluid instead of a gaseous fluid, which could be advantageous in underwater conditions; the amplifiers could be of the wall attachment, the jet impingement, pressure reaction, or any other convenient type; the circuitry and ducting can be rearranged in many ways, and the fixed restrictions could be small orifices or capillaries of fixed dimensions, or adjustable needle valves, set up after assembly to accommodate the requirements of the circuit. The system, in addition, has application wherever rate of change of pressure functions are required.

I claim:

1. A system for obtaining an output related to rate of change of ambient pressure from a fluid amplifier device subjected to said ambient pressure, said amplifier device, being vented to ambient, including a fluid power jet, which issues from a power nozzle, and is capable of being directed either to vent or to at least one other output channel by interaction with at least one pair of control nozzles opposed to each other in their effect upon the power jet, wherein fluid flows from a source of fluid at a pressure above the ambient pressure through ducts to said pair of control nozzles, one of said ducts having a greater volumetric capacity than the other duct supplying the opposed nozzle of said pair of control nozzles, in order to cause a lead or lag of fluid pressure or flow between one and the other of said pair of control nozzles during a pressure change.

2. A fluid control system, whereby an output signal related to rate of change of ambient pressure and derived from a sensing device subjected to said ambient pressure, is passed through at least one fluid amplifier stage, said stage having means to suppress the output from said sensing device during stable pressure conditions, and including variably biased control means, for restricting the output from said sensing device to within a predetermined range, the resultant signal being applied to said control system as a function of rate of change of pressure.

3. A fluid control system as claimed in claim 2, wherein said sensing device is a vented fluid amplifier of the type having a fluid power nozzle and at least a pair of opposing control nozzles issuing fluid in intercepting relationship with the power jet, and directing said power jet through one or more outlet channels.

4. A fluid control system as claimed in claim 3, wherein fluid flows from a source of fluid at a pressure above the ambient pressure through ducts to said pair of control nozzles, one of said ducts having a greater volumetric capacity than the other duct supplying the opposed nozzle of said pair of control nozzles, in order to cause a lead or lag of fluid pressure or flow between one or other of said pair of control nozzles during a pressure change.

5. A system as claimed in claim 2, wherein a first stage, including a pair of fluid amplifiers, is provided with a fixed bias flow through control nozzles to suppress the output from said sensing device during stable conditions, and a second stage including a pair of fluid amplifiers is provided with said variable bias control.

6. A fluid pressurization system for aircraft, including a fluid amplifier rate of change of pressure control, said control comprising a biassing system for fluid amplifier circuits having at least one power jet issuing from a power nozzle, and at least one fluid bias jet imposed from a bias control nozzle, and operable on said at least one power jet, wherein regulation of the flow of fluid to at least one of said bias control nozzles is interrelated with the flow of fluid to at least one of said power nozzles, and means causing variation in the flow of fluid to the interrelated bias control nozzle producing inversely proportional variations in the flow of fluid from the interrelated power nozzle, said variation resulting in an output signal through channels that is applied to said pressurization system as a function of rate of change of pressure.

References Cited

UNITED STATES PATENTS

| 3,248,053 | 4/1966 | Phillips | 137—81.5 |
| 3,326,463 | 6/1967 | Rerder | 137—81.5 |

FOREIGN PATENTS 1,458,767  10/1966  France.

MEYER PERLIN, Primary Examiner

U.S. Cl. X.R.

137—81.5